United States Patent [19]

Seko et al.

[11] Patent Number: 4,581,607
[45] Date of Patent: Apr. 8, 1986

[54] SYSTEM AND METHOD FOR DETECTING DRIVER DROWSINESS OF A VEHICLE

[75] Inventors: Yasutoshi Seko, Yokohama; Haruhiko Iizuka, Yokosuka; Takayuki Yanagishima, Yokosuka; Hideo Obara, Yokosuka, all of Japan

[73] Assignee: Nissan Motor Company, Ltd., Kanagawa, Japan

[21] Appl. No.: 580,174

[22] Filed: Feb. 15, 1984

[30] Foreign Application Priority Data

Feb. 18, 1983 [JP] Japan ................................ 58-24607

[51] Int. Cl.$^4$ ............................................ G08B 23/00
[52] U.S. Cl. ................................... 340/576; 180/272
[58] Field of Search ..................... 340/575, 576, 52 R, 340/52 D; 180/272

[56] References Cited

U.S. PATENT DOCUMENTS

| 4,463,347 | 7/1984 | Seko et al. | 340/576 |
| 4,496,938 | 1/1985 | Seko et al. | 340/576 |
| 4,518,954 | 5/1985 | Seko et al. | 340/576 |

FOREIGN PATENT DOCUMENTS

| 059225 | 8/1982 | European Pat. Off. |
| 1269902 | 6/1968 | Fed. Rep. of Germany |
| 55-121732 | of 1980 | Japan |
| 56-153267 | of 1981 | Japan |
| 57-57126 | of 1982 | Japan |
| 57-172808 | of 1982 | Japan |

OTHER PUBLICATIONS

Copy of Specification corresponding to U.S. patent application Ser. No. 476,519, pending in U.S. Patent Office.

Primary Examiner—James L. Rowland
Assistant Examiner—Jeffery A. Hofsass
Attorney, Agent, or Firm—Lowe, King, Price & Becker

[57] ABSTRACT

A system and method for detecting driver drowsiness on the basis of steering pulses, each steering pulse being produced whenever a steering wheel is rotated through a predetermined angle and indicating the direction of rotation of the steering wheel, comprising means for detecting the roughness of the road surface on which the vehicle is travelling and interrupting the detection of driver drowsiness for a fixed interval of time when the road surface roughness exceeds an acceptable level, i.e. a level conductive to accurate drowsiness detection.

16 Claims, 23 Drawing Figures

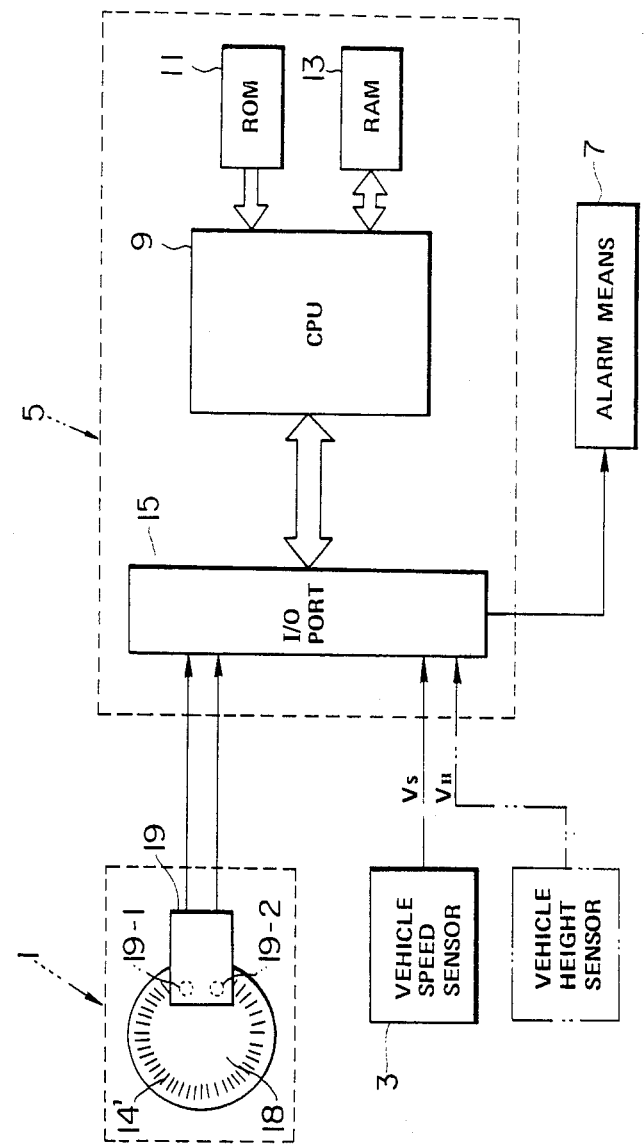

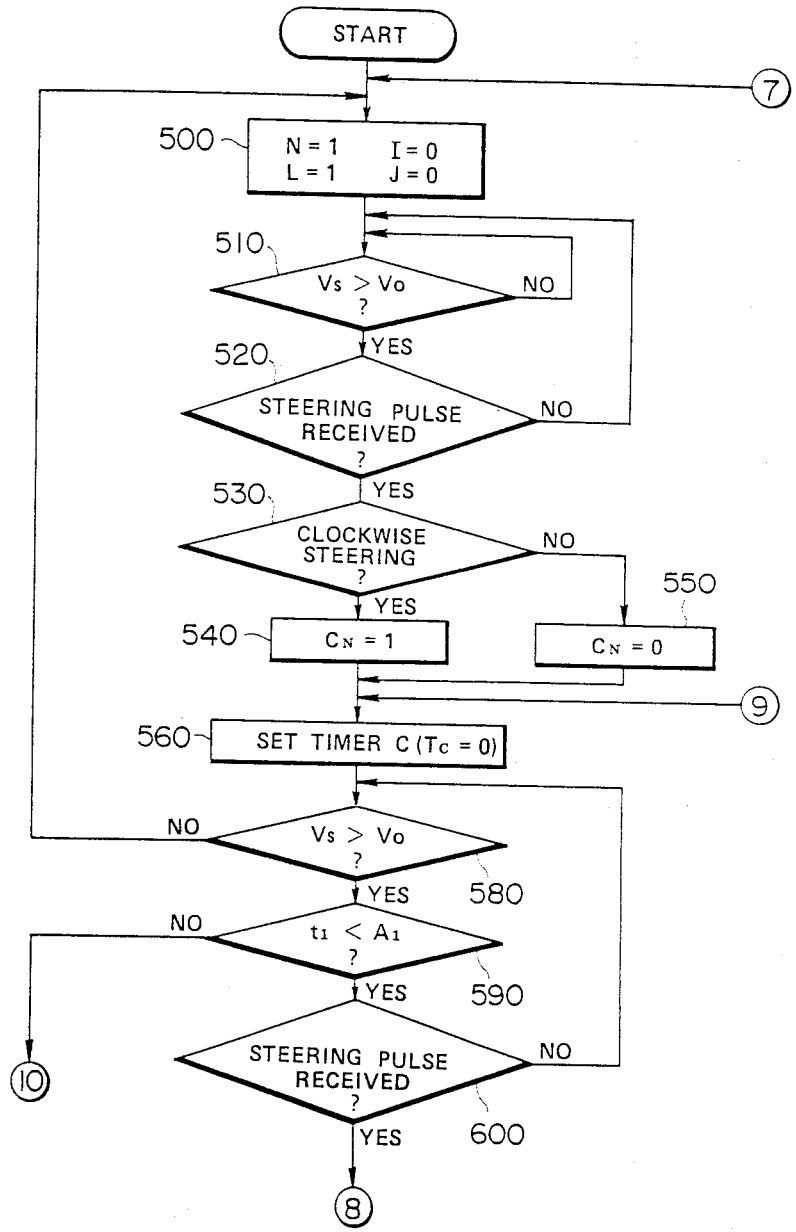

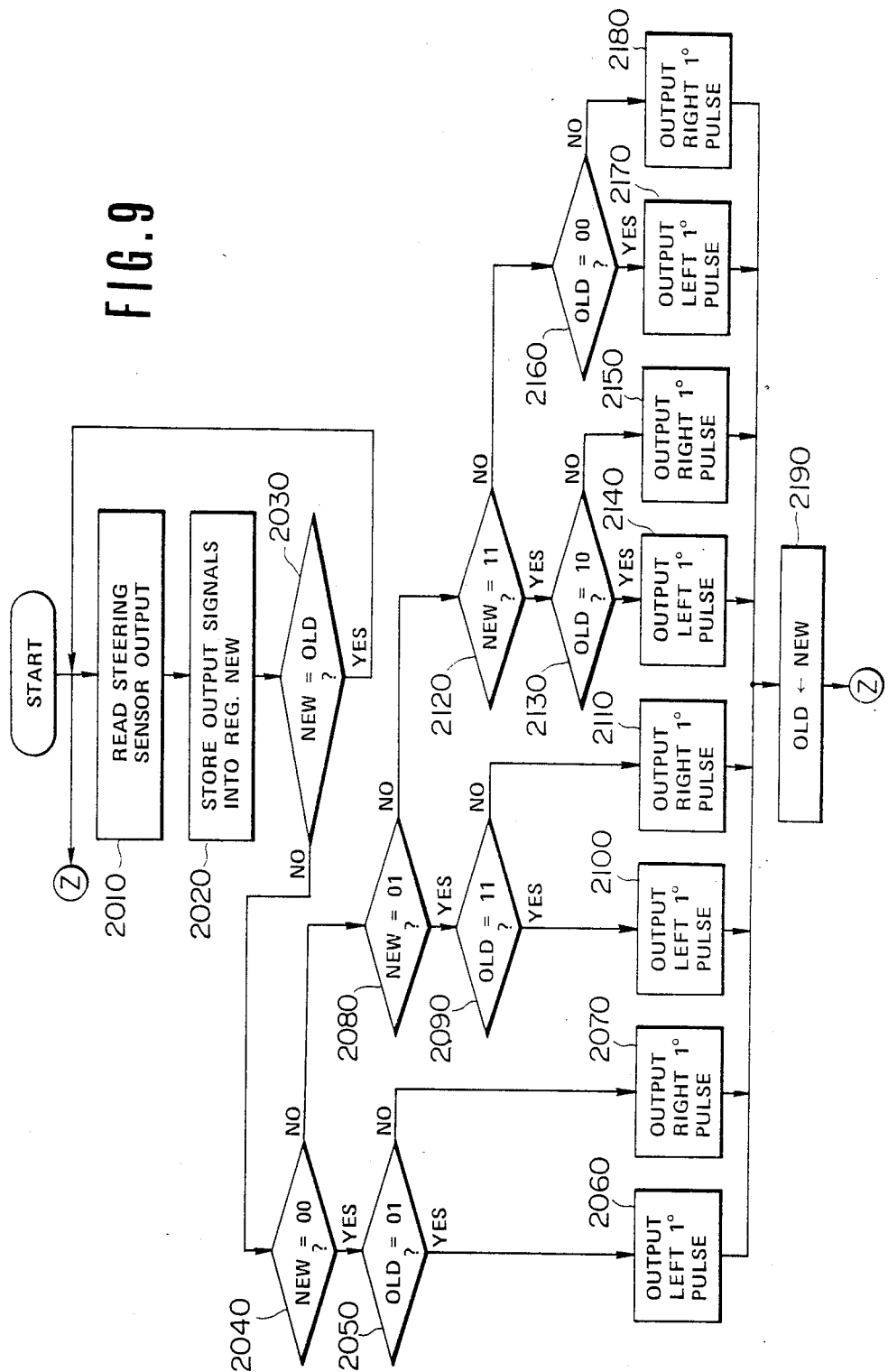

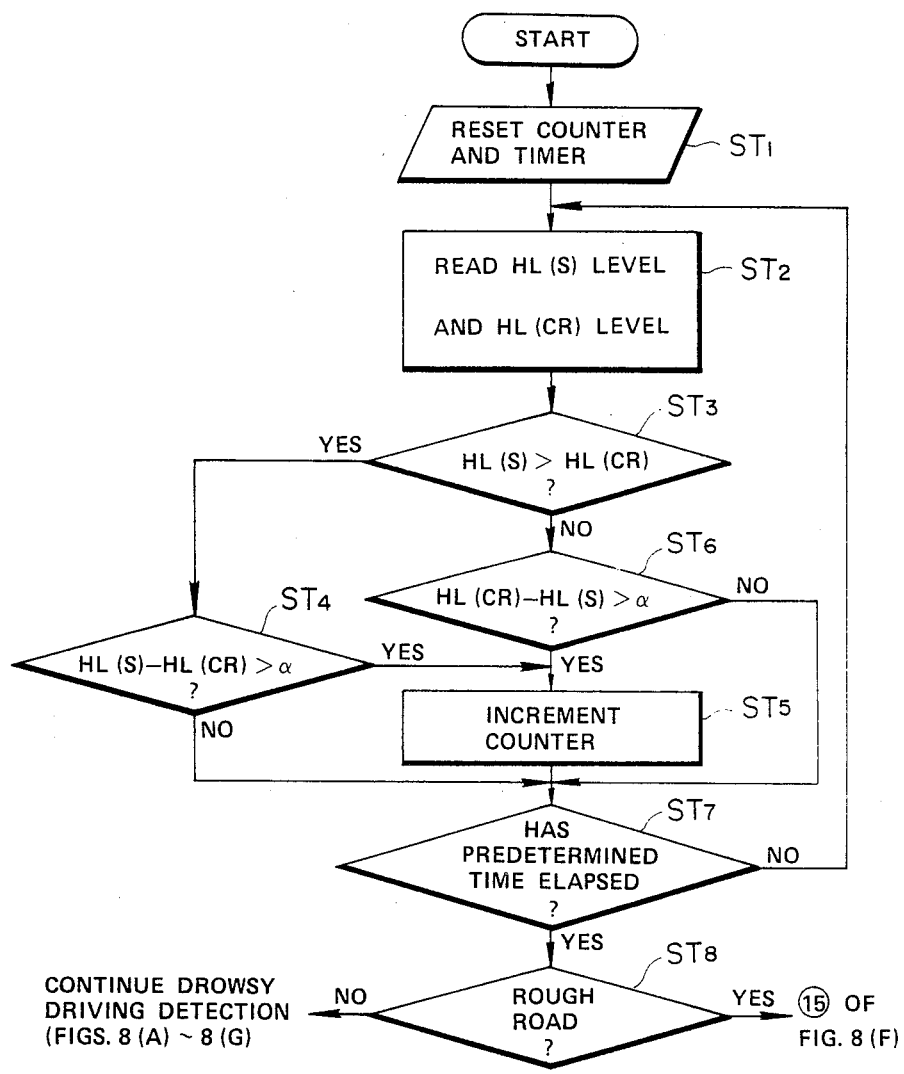

SYSTEM AND METHOD FOR DETECTING DRIVER DROWSINESS OF A VEHICLE

BACKGROUND OF THE INVENTION

1. Field of the Invention

The present invention relates to a system and method for detecting driver drowsiness and generating an alarm when the driver becomes drowsy while the vehicle is moving at greater than a predetermined speed, and more particularly, a system and method comprising means for detecting and signalling the roughness of the road surface on which the vehicle is running and means for determining from an output signal of said detecting means that the vehicle is running on a rough road and interrupting the detection of drowsy driving, so as to prevent erroneous detection of drowsy driving due to the abnormal steering operations while running on the rough road.

2. Description of the Prior Art

Japanese Utility Model Registration Publication No. 57-57126 discloses a system for recognizing the vehicle driver drowsiness, wherein the system determines that the vehicle driver is driving drowsily depending on the number of steering pulses, each steering pulse being produced whenever the steering wheel is rotated through a predetermined angle, produced within a predetermined period of time. The disclosure of the above-described publication is incorporated herein by reference.

However, the system disclosed in the above-described publication may occasionally erroneously detect drowsiness. For example, when the vehicle is running on an unpaved road, the angular extent steering adjustments tends to be greater than when the vehicle is running on a paved road due to the necessity for the driver to correct the direction of the vehicle course a number of times due to the holes and bumps of the unpaved road surface. In such cases, steering adjustments tend to involve a large angle of steering in spite of driver alertness.

In more detail, while driving on rough roads, the system determines erroneously that the vehicle driver is drowsy because the number of steering pulses exceeds a predetermined number over a fixed interval of time.

SUMMARY OF THE INVENTION

With the above-described problem in mind, it is an object of the present invention to provide an error-free system and method for detecting driver drowsiness.

This can be achieved by providing a system and method for detecting driver drowsiness employing steering pulses, each produced whenever the steering wheel is rotated through a predetermined angle, the system comprising means for detecting and signalling the roughness of a road surface and means for determining when the vehicle is travelling on a rough road on the basis of the output signal of the detection means and interrupting the detection of drowsy driving upon such determination.

BRIEF DESCRIPTION OF THE DRAWINGS

A more complete understanding of the present invention may be obtained from the following description taken in conjunction with the drawings in which like reference numerals designate corresponding elements and in which:

FIG. 1 is a simplified block diagram of the system for detecting driver drowsiness according to the present invention;

FIGS. 8(A) through 8(G) are, in combination, a detailed processing flowchart subsequent to that shown in FIGS. 7(A) through 7(D) of the preferred embodiment;

FIG. 9 is a detailed flowchart for processing the output signals of the steering angle sensor 1 in connection with FIGS. 7(A) through 8(G)

FIG. 11 is a processing flowchart for determining when the vehicle is travelling on a rough road using a detection signal $V_H$ of a vehicle height sensor shown in phantom line of FIG. 1.

DETAILED DESCRIPTION OF THE PREFERRED EMBODIMENTS

Figure 2A:
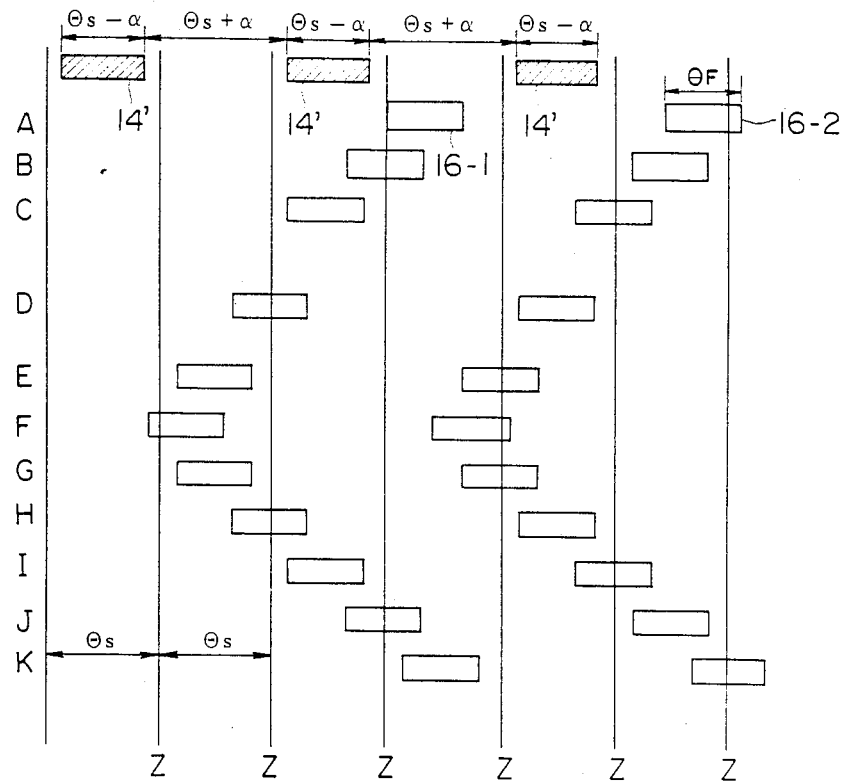
FIGS. 2(A) and 2(B) are explanatory diagrams of the output of a steering angle sensor 1 shown in FIG. 1.

Reference will hereafter be made to the drawings in order to understand the present invention.

FIGS. 1 through 10 shows a preferred embodiment of the present invention.

FIG. 1 is a simplified block diagram of the structure of the system for detecting driver drowsiness according to the present invention.

In FIG. 1, numeral 1 denotes a steering angle sensor, numeral 3 denotes a vehicle speed sensor for detecting the speed of the vehicle, numeral 5 denotes a drowsy driving detection means for detecting driver drowsiness on the basis of steering pulses derived from the steering angle sensor 1 and the output signal from the vehicle speed sensor 3 and actuating an alarm when the drowsy driving detection means 5 detects that the driver is getting drowsy. The drowsy driving detection means 5 comprises a microcomputer including a Central Processing Unit (CPU), Read-Only Memory (ROM), Random-Access Memory (RAM), and Input/Output Port 15.

Figure 2B:
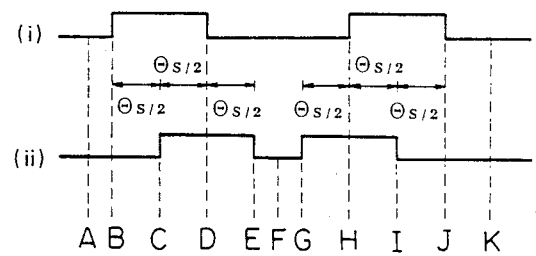

The steering angle sensor 1 comprises: (a) a disk 18 rotating together with a steering wheel (not shown) and having a plurality of slits 14' arranged radially symmetrically about its circumference, each slit 14' covering a sector $(\theta - \alpha)$ around the circumference and having an edge-to-edge separation from adjacent slits of $(\theta + \alpha)$ as shown in FIG. 2(A); and (b) a photo interrupter module 19 spanning the disk 18 and having a pair of photo interrupters 19-1 and 19-2, each photo interrupter 19-1 and 19-2 emitting a light beam through a corresponding slit 16-1 and 16-2 having a width of $\theta_F$ on the same order of magnitude as $\theta_s$ and receiving the light beam passed through the corresponding slit 16-1 and 16-2 and through one of the slits 14' of the disk 18. The photo interrupter module 19 produces two parallel pulse signals (i) and (ii) as shown in FIG. 2(B) having a phase difference of $\eta s/2$. The rotational direction of the steering wheel determines which of the two parallel signals (i) and (ii) leads in phase. The processing of the two (photo-electrically converted) parallel signals (i) and (ii) will be described later with reference to FIG. 9.

It should be noted that separation between the photo interrupters 19-1 and 19-2 is to satisfy the following expression in order to yield an angular resolution of $\theta s/2$: $n \times \theta s + 5(\theta s/2)$ ($n = 0, 1, \ldots$).

It should be noted that symbol Z in FIG. 2(A) denotes a boundary determining whether the two signals produced by the steering angle sensor 1 are present or absent.

A major feature of the present invention is that the system for detecting driver drowsiness interrupts the detection of driver drowsiness for a fixed interval of time when the system detects that the vehicle is travelling on a rough road such as an unpaved road.

Detection methods for detecting driver drowsiness in this embodiment can roughly be divided into two parts. In one method, driver drowsiness is detected when the number of steering pulses N per a fixed interval of time $A_1$ exceeds a first empirically predetermined number $N_T$, each steering pulse being produced whenever the steering wheel is rotated through a predetermined angle, and the number of steering reversals D per the fixed interval of time $A_1$ is below a second empirically predetermined number $D_T$. This is based on the fact that as the number of steering pulses N per the fixed interval of time $A_1$ increases both when the driver is alert and when the driver is drowsy, the number of steering reversals D decreases when the driver is drowsy and, on the other hand, the number of steering reversals D increases when the driver is alert.

Figure 3:
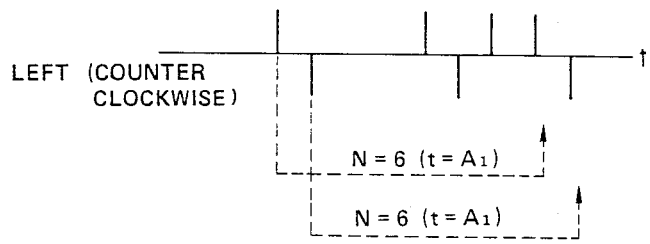
FIGS. 3, 4 and 5 are examples of output patterns of the steering angle sensor 1 derived from rotation of a steering wheel of the vehicle in either direction.
Figure 4:
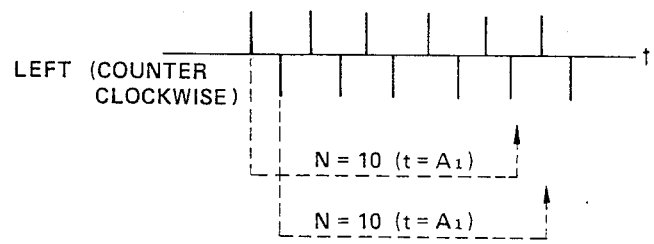

FIGS. 3 and 4 illustrate the relationship between steering pulses and steering reversals in the case where the driver steers in a state of alertness.

Figure 5:
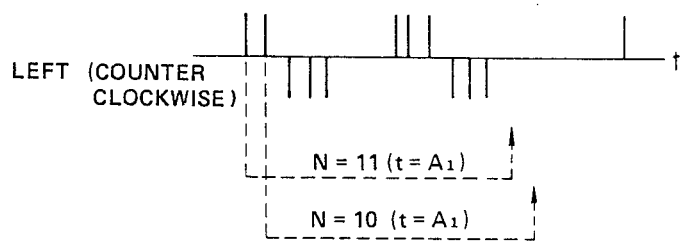

FIG. 5 illustrates the relationship between steering pulses and steering reversals in the case where the driver steers drowsily.

As shown in FIG. 3, the number of steering pulses N is 6 and the number of steering reversals D is 4. As shown in FIG. 4, the number of steering pulses N is 10 and the number of steering reversals is 9. As shown in FIG. 5, the number of steering pulses N is 11 and the number of steering reversals D is 3. As appreciated from FIGS. 3, 4 and 5, the steering reversals D make up a major portion of the steering pulses N.

It should be noted that the steering pulses arranged on the upper side of the time axes t of FIGS. 3, 4 and 5 are those due to clockwise rotation of the steering wheel (right) and the steering pulses on the lower side of the time axes t are those derived from counterclockwise rotation of the steering wheel (left).

Figure 6A:
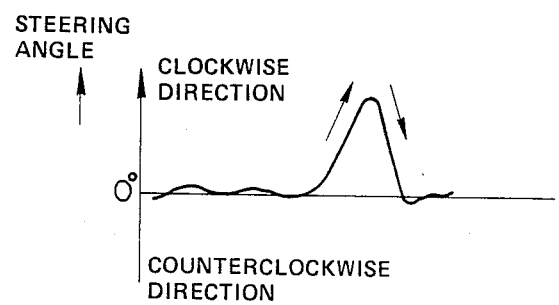
FIGS. 6(A) and 6(B) are another example in combination of a quick steering operation representative of when a driver of the vehicle is drowsy.
Figure 6B:
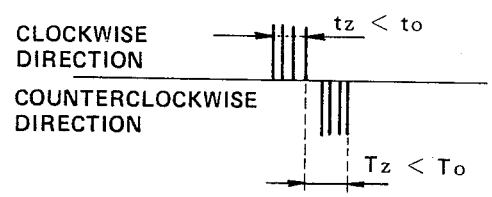

In another detection method, driver drowsiness is detected on the basis of the time taken for the input of a predetermined number of steering pulses (4 in this embodiment), i.e., a steering operation duration over a fixed steering angle in the same rotational direction of the steering wheel (the time tz required for a first steering operation) is compared with a reference time $t_o$ (, e.g., 0.75 seconds) and the time Tz required for a second steering operation is compared with another reference time To (, e.g., 1 second). The first steering operation means a quick unidirectional steering operation after a period of no steering operations. The second steering operation means a quick unidirectional steering operation was needed after the first steering operation for the driver to correct the direction of the vehicle. This can be appreciated from FIGS. 6(A) and 6(B). FIG. 6(A) shows a typical history of change of the steering angle when the driver is drowsy. In FIG. 6(A), the analog signal level above the 0°-axis of the steering angle is due to clockwise rotation of the steering wheel and that located below the 0°-axis of the steering angle is derived from counterclockwise rotation of the steering wheel. FIG. 6(B) shows the steering pulses produced when the steering operation shown in FIG. 6(A) is carried out. The concept of this detection method is disclosed in Japanese Utility Model Registration Publication No. 55-121732, the disclosure of which is incorporated herein by reference.

FIGS. 7(A) through 7(D) combine to form a processing flowchart of the drowsy driving detection system 5.

The operation of the system can be divided into two main loops: (a) a reference value setting loop (FIG. 7) for setting first and second reference values $N_T$ and $D_T$, the first reference value $N_T$ being set according to the number of steering pulses derived from samples taken under normal driving conditions and second reference value $D_T$ similarly being set according to the number of steering reversals, i.e., the number of times the rotational direction of the steering wheel is changed from the clockwise direction to the counterclockwise direction and vice versa; and (b) a drowsy driving detection loop (FIG. 8) for detecting driver drowsiness with the aid of the first and second reference values set in the reference value setting loop.

Figure 7A:
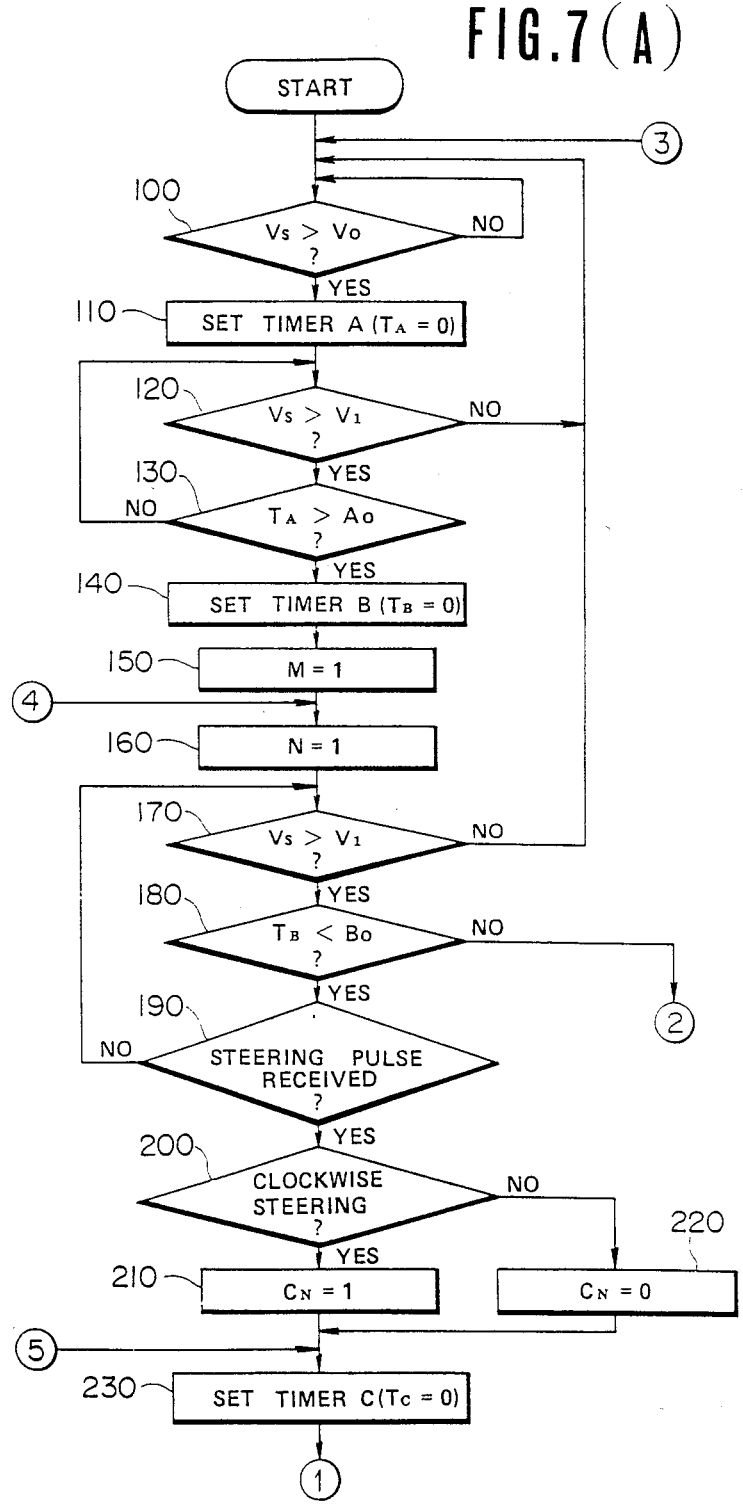
FIGS. 7(A) through 7(D) are, in combination, a detailed processing flowchart of a reference value setting loop of a preferred embodiment of the present invention.
Figure 7B:
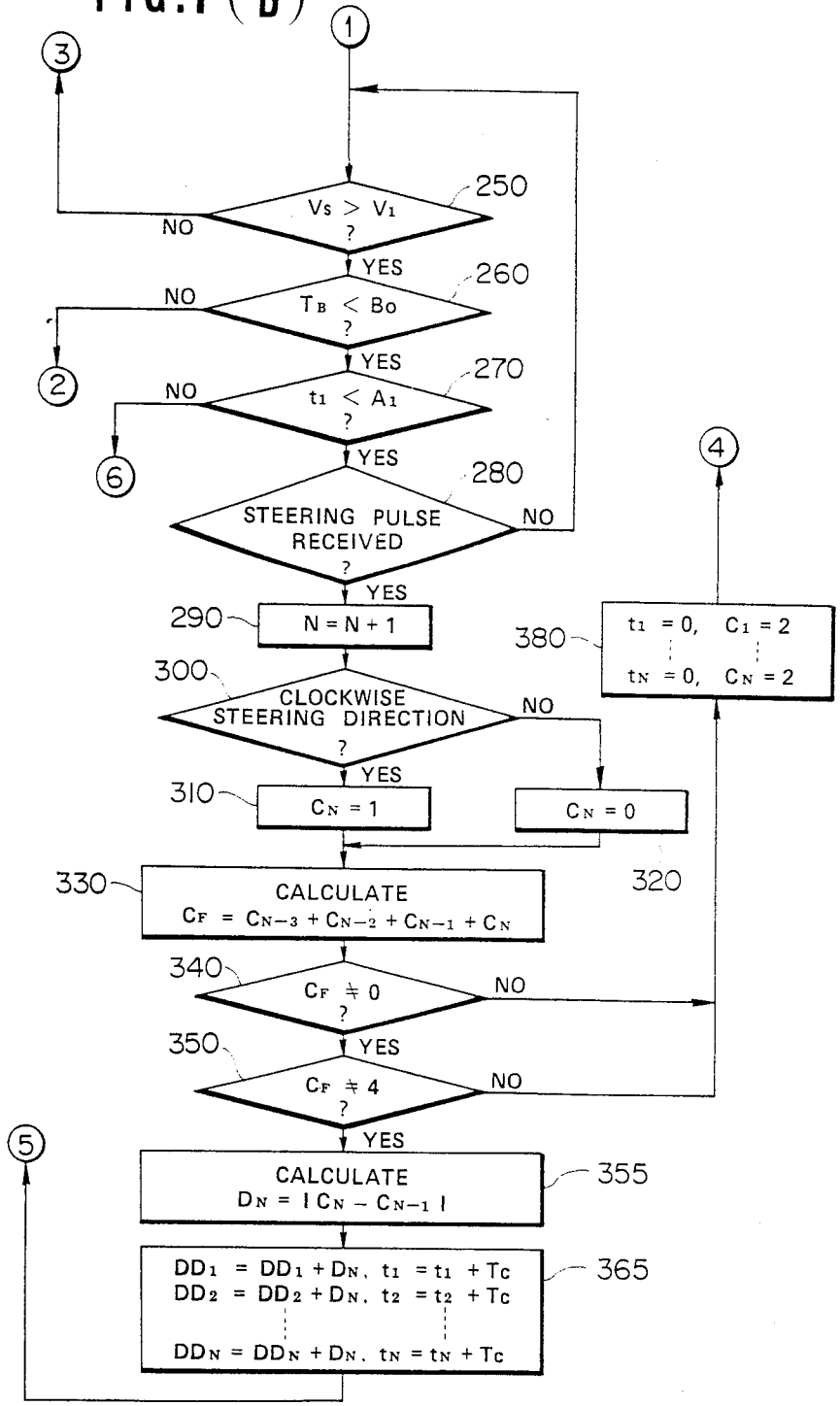
Figure 7C:
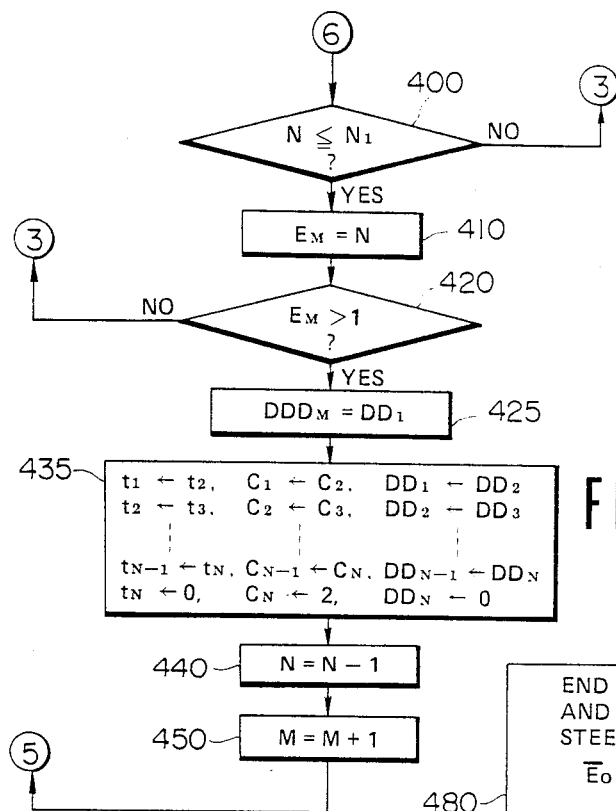
Figure 7D:
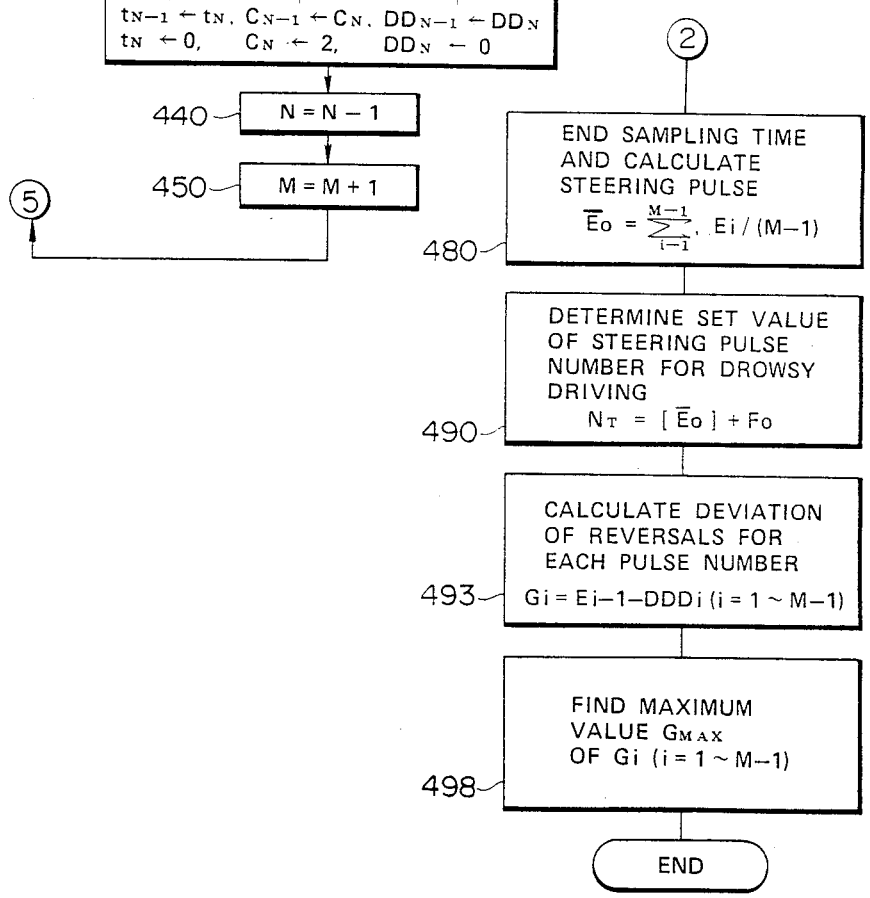
Figure 8B:
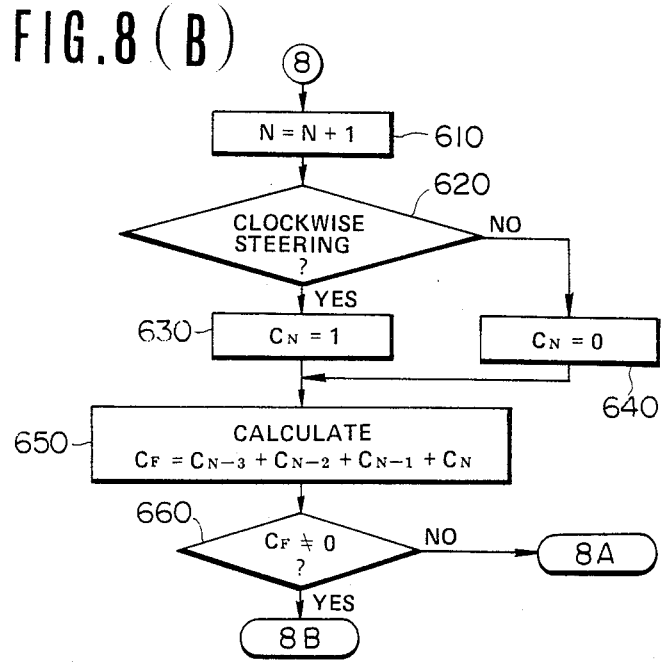
Figure 8C:
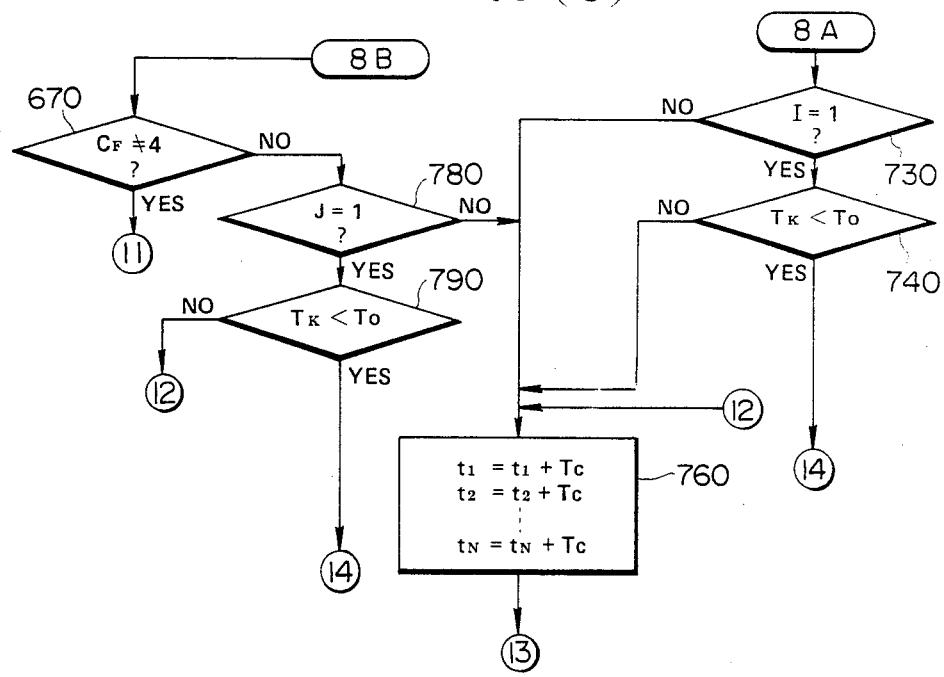
Figure 8D:
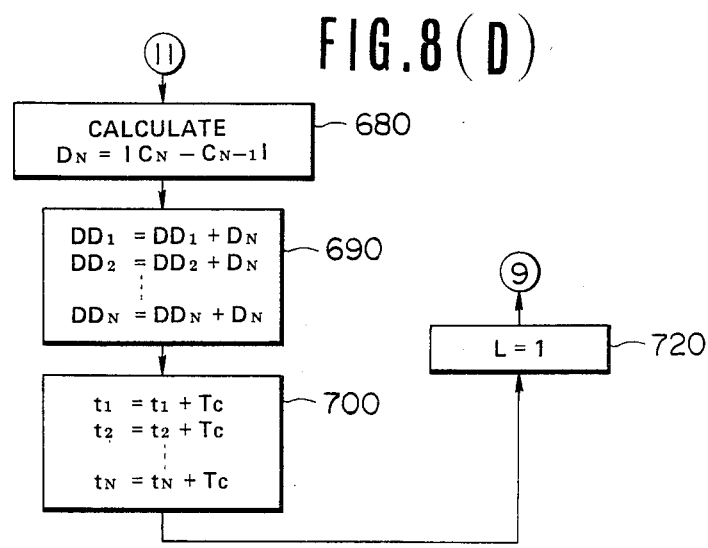
Figure 8E:
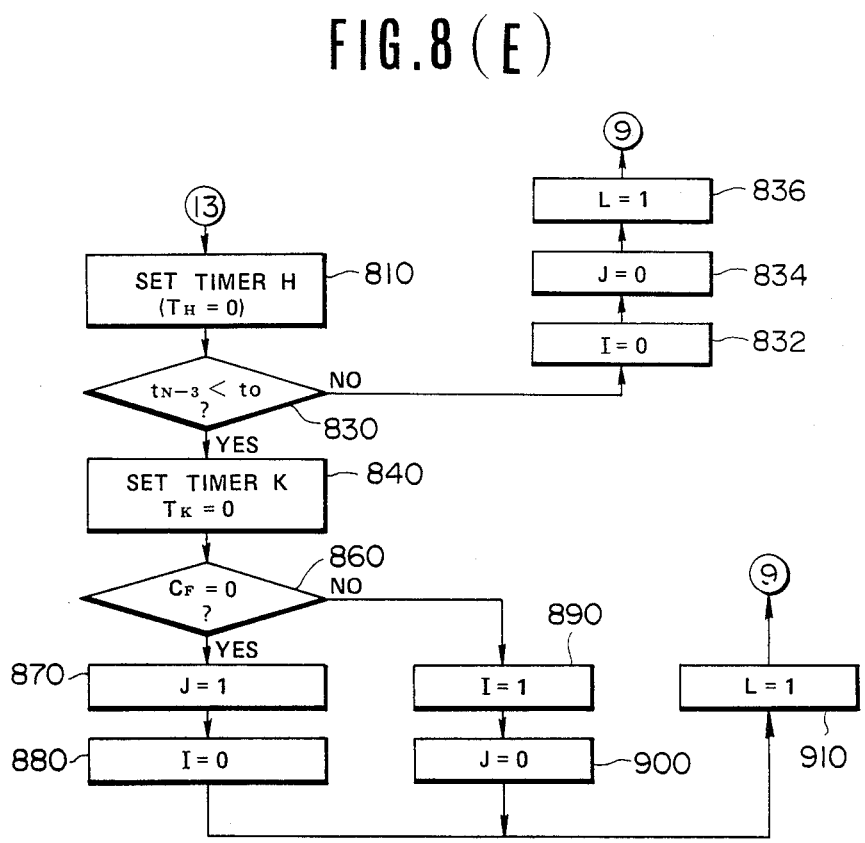
Figure 8F:
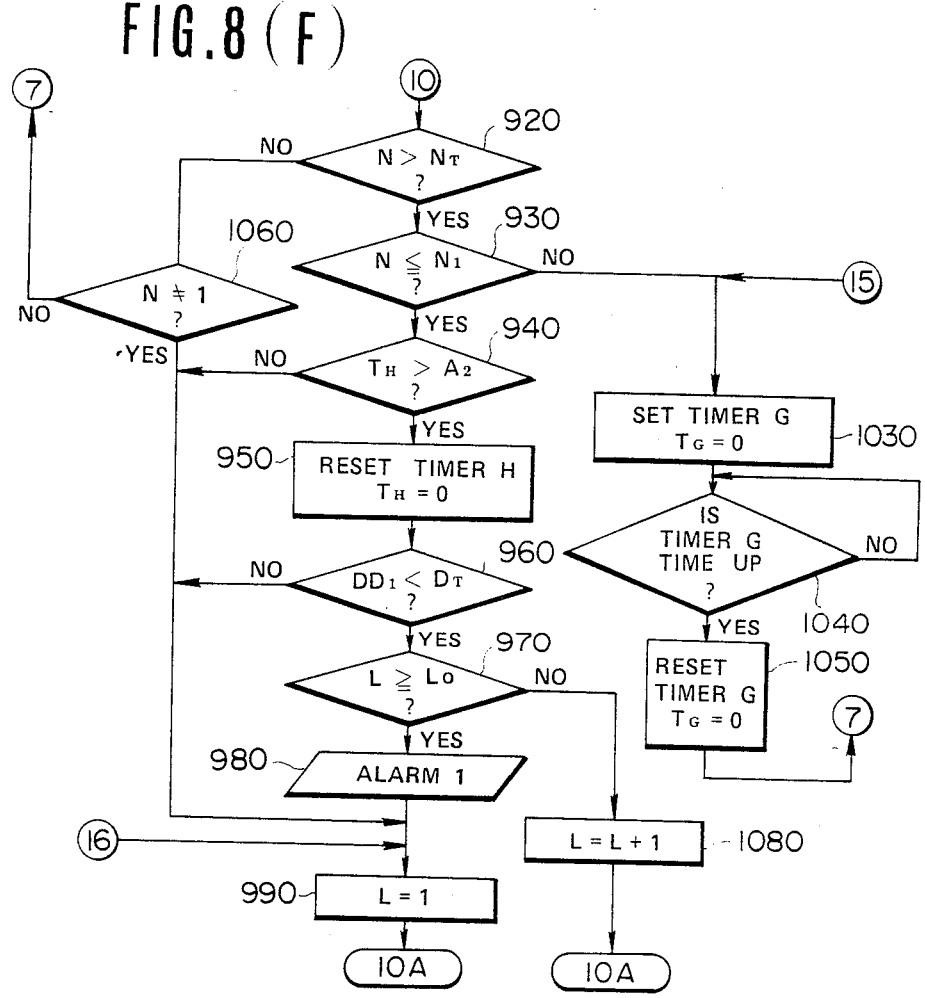
Figure 8G:
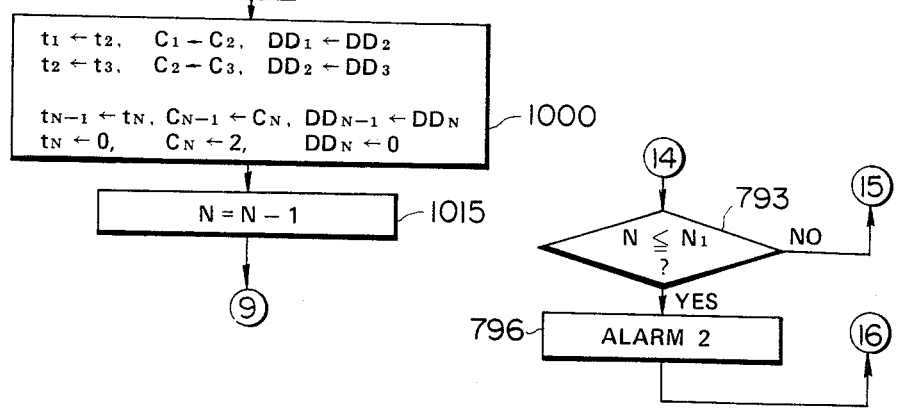
Figure 10:
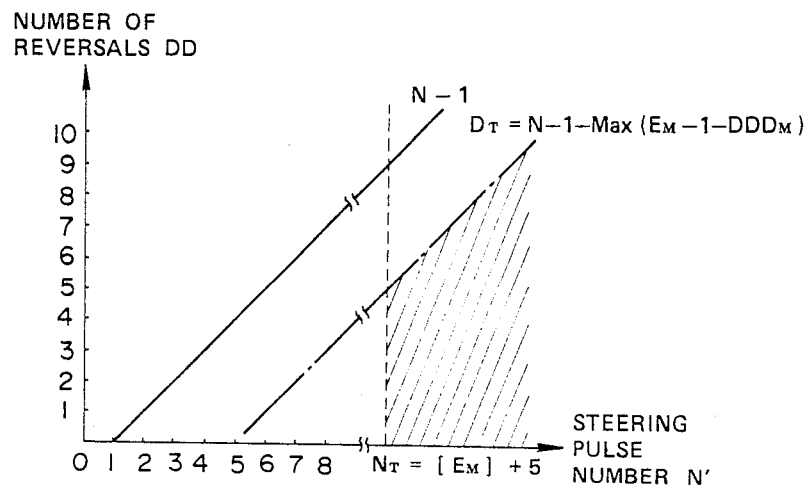
FIG. 10 is a supplemental graph showing the relationship between the number of steering reversals (DD) and number of steering pulses (N).

In step 100 in FIG. 7(A), the CPU 9 detects whether the vehicle speed Vs measured by the vehicle speed sensor 3 exceeds a first predetermined value Vo (, e.g., 70 km/h). After the CPU 9 detects that the vehicle speed Vs exceeds the first predetermined value of speed Vo, the routine goes to step 110, wherein a timer A is started in order to measure a predetermined interval of time Ao (, e.g., 1 minute). In step 120, the CPU 9 confirms that the vehicle speed Vs is above a second predetermined value $V_1$ which is slightly less than the first predetermined value Vo throughout the above-described predetermined period of time Ao in order to prevent drowsiness evaluation in such transient states as when, e.g., the vehicle is moving from an interchange of a highway road to a thru lane. After the confirmation in steps 100 through 130, the routine goes to a subsequent processing loop to obtain the first characteristic value $N_T$ (steps 140 through 498).

In step 140, a timer B is started in order to measure a previously set data sampling period Bo (, e.g., 5 minutes). In step 150, a register M, which is to be incremented whenever a fixed interval of time $A_1$ passes after the last received steering pulse (the fixed interval of time $A_1$ will be described later), is set to an initial value of 1. In step 160, a register N representing the number of steering pulses received is also set to an initial value of 1. In subsequent step 170, the CPU 9 checks to see if the current vehicle speed Vs is still above the second predetermined value $V_1$. If not, the processing loop is restrated from step 100. If so, in step 180 the CPU 9 checks to see if the sampling period $B_0$ has elapsed. This will not be the case, practically, until numerous steering pulse have been received, so in this case, control passes to step 190 (otherwise to step 480), which returns control to steps 170 and 180 until the first steering pulse is received.

After the CPU 9 receives the first steering pulse in the step 190, the CPU 9 in step 200 determines whether the first steering pulse is derived from clockwise or counterclockwise rotation of the steering wheel. The method for determining the rotation direction will be described later. If clockwise rotation is determined (YES in the step 200), then the first (N=1) cell of a steering direction array $C_N$ is set to 1 in the next step 210. On the other hand, if counterclockwise rotation is determined (NO in the step 200), the cell $C_N$ is set to 0 in step 220. In subsequent step 230, the CPU 9 sets a timer C which indirectly clocks the duration of a fixed interval of time $A_1$ (, e.g., 15 seconds). The timer C is actually used to clock the intervals between consecutive steering pulses. The pulse intervals are tallied in a series of staggered running time totals $t_1-t_n$, to be described in detail later, the largest of which is repeatedly compared with the fixed interval $A_1$.

In subsequent steps 250 and 260, vehicle speed Vs and sampling time $T_B$ are checked as in steps 170 and 180. Again, control passes to step 480 if the data sampling period Bo has elapsed ($T_B > Bo$), and the routine is restarted from step 100 if vehicle speed Vs has dropped below the threshold level $V_1$. Otherwise, the sum $t_1$ of the intervals between the last N steering pulses is compared to the fixed interval $A_1$ in step 270 and if $t_1 \geq A_1$, control passes to step 400 to be described later. If $T_1 < A_1$, then in step 280, the next steering pulse is awaited. If a steering pulse corresponding to the current N value has not been received, the loop 250–280 is repeated.

After a steering pulse has been received in the step 280, the register N is incremented in step 290 and the CPU 9 executes the same processing as in the steps 200 through 220 described above in steps 300–320. After the CPU 9 has performed the flag assignment of the register $C_N$ in either step 310 or step 320, the routine goes to step 330 wherein the CPU calculates the sum $C_F$ of the last four rotation direction flag registers $C_N$ through $C_{N-3}$. For example, if two of the last four steering pulses were due to clockwise rotation of the steering wheel, the sum of the last four flag registers C, i.e., $C_{N-3}+C_{N-2}+C_{N-1}+C_N$, is two. This step in conjunction with the subsequent steps 340 and 350 serves to check the incoming steering pulse train for long series of pulses in the same direction, which would imply that the vehicle is executing a turn. Since this would not provide a representative sample of steering pulses, if a turn is recognized in steps 340 or 350, the steering pulse count is cleared until more typical, back-and-forth steering prevails. (This test is applied only after the number of inputted steering pulses reaches 4). In more detail, in step 340, if the sum $C_F$ equals 0, the vehicle is judged to be passing through a left-hand curve since the contents of the registers $C_N$, $C_{N-1}$, $C_{N-2}$, and $C_{N-3}$ are all zero. On the other hand, if $C_F=4$ in step 350 the vehicle is judged to be passing through a right-hand curve since the contents of the registers $C_N$, $C_{N-1}$, $C_{N-2}$, and $C_{N-3}$ are all 1. In both cases (, i.e., $C_F=0$ and $C_F=4$), the time values in the registers $t_1$ through $t_N$ are cleared and the registers $C_1$ through $C_N$ are set to some numerical value (in this embodiment, 2) other than 0 and 1 in step 380. Then, the routine returns to the step 160 to restart the counting of the steering pulses.

On the other hand, if the routine does not return to the step 160, i.e. if $1 \leq C_F \leq 3$ in steps 340, 350, then first a reversal flag $D_N$ is derived from the difference between the last two direction flags $C_N$, $C_{N-1}$ in step 355 and then in step 365, the flag $D_N$ is added to each of a number of reversal total registers $DD_1$ through $DD_N$ and the measured interval of time (indicated by the value $T_c$ of the timer C) between the last steering pulse and the immediately preceding steering pulse is added to the registers $t_1$ through $t_N$, each indicating the elasped time from one of the last N steering pulses and control returns to the step 230 to restart the timer C. This loop 230–365 is repeated for each steering pulse until one of the period $A_1$ or Bo has elasped.

When the register $t_1$ indicates in the step 270 that the fixed interval of time $A_1$ has elapsed, the routine goes to step 400. In the step 400, if the value of the register N indicating the number of steering pulses within the fixed interval of time $A_1$ is greater than a fixed number of pulses $N_1$, the steering pulses are judged to be due to abnormally repetitive steering operations as the vehicle moves along a rough road. In this case also, the steering pulse characteristics are not representative of normal driving behavior and so the steering pulse sampling process is restarted from step 100. On the other hand, if in the step 400 $N \leq N_1$, the counted number of steering pulses (the value of the register N) is loaded into one cell $E_M$ of an array E so as to record the number of steering pulses for each of a plurality of staggered fixed time intervals $A_1$ within the data sampling period Bo in step 410. Next in step 420, the value $E_M$ is checked against a lower limit, namely 1.

If it is determined in step 420 that $E_M > 1$, the total reversal count $DD_1$ for the last interval $A_1$ is stored in a corresponding cell $DDD_M$ of an array DDD and then the contents of the registers $t_2$ through $t_N$, registers $C_2$ through $C_N$ and registers $DD_1$ through $DD_N$ are moved in step 430 into corresponding registers whose subscripts are reduced by one, e.g., $t_1 \leftarrow t_2$, $t_2 \leftarrow t_3$, ..., $t_{N-1} \leftarrow t_N$, $t_N \leftarrow 0$, $C_1 \leftarrow C_2$, $C_2 \leftarrow C_3$, ..., $C_{N-1} \leftarrow C_N$, $C_N \leftarrow 2$. $DD_1 \leftarrow DD_2$, $DD_2 \leftarrow DD_3$, ... $DD_{N-1} \leftarrow DD_N$, $DD_N \leftarrow 0$. Also, the final registers $T_N$ and $C_N$ are assigned values 0 and 2 respectively. Thus, as the subscripts increase through the t-array, the values thereof decrease since they include one less term of timer $T_c$ each, up to a zero value in $t_N$. In other words, $t_{N-1}$ and $C_{N-1}$ represent the pulse interval and direction of the last successfully received pulse. Next in steps 440 and 450, the CPU 9 decrements the register N by one and increments the register M by one, respectively. Thereafter, the routine returns to the step 230.

In summary, to this point the CPU 9 counts steering pulses received in a number of overlapping periods $A_1$ starting which each pulse, as shown by the dotted line in FIGS. 3–5. If the number of pulses received and their directions reflect suitably typical steering conditions, the pulse counts are recorded in (M−1) cells of an array.

Finally, after the timer $T_B$ indicates that the elapsed time covers the data sampling period Bo (step 180 or step 260), the data sampling is stopped and calculates an average number of steering pulses Eo per fixed interval of time $A_1$ is calculated in step 480 according to the equation $$\overline{Eo} = \sum_{i=1}^{M-1} Ei/(M-1).$$

Thereafter, the routine goes to step 490 wherein the calculated average pulse number $\overline{Eo}$ is incremented by a fixed number (, e.g., 5) and the final value is the first reference value $N_T$. In step 493, an array G of non-reversal pulse counts is constructed by subtracting each reversal count $DDD_i$ from the total number of pulses Ei in the same period minus one. The maximum value of array G is then found in step 498. This maximum value $G_{MAX}$ represents the upper limit of non-reversal pulses and so in a sense represents a lower limit of reversals. This value will be used repeatedly in FIG. 9 to derive the second reference value $D_T$ in accordance with current driving conditions. Thereafter, the routine goes to the subsequent drowsy driving detection loop starting at 500, shown in FIG. 8.

It should be noted that if during the execution of the first reference value setting loop, the vehicle speed Vs drops below the second predetermined value $V_1$ in the step 250 (or the steps 120 and 170), the sampling process is restrated from the step 100.

Next, the drowsy driving detection loop will be described in detail with reference to FIGS. 8(A) through 8(G).

First in this loop, the register N and the register L which indicates the number of times the drowsy driving detection loop has been carried out are set to 1 and registers I and J, used to identify the direction of a current abrupt steering adjustment, if any, are set to zero in step 500. Then the vehicle speed Vs is checked to ensure that driving conditions match those of FIG. 7, at least in general. Once speed Vs exceeds the threshold speed Vo, the routine goes to step 520 to wait for receipt of a steering pulse. Subsequent pulses undergo the same processing as described in the steps 200 through 350 in the reference value setting loop (except the step 260) but with the routine going to step 680 if the value of $C_F$ is neither 0 nor 4 in steps 660 and 670 or to step 920 if $t_1 < A_1$ at step 590.

In the step 680, in order to derive the number of steering reversals per fixed interval of time $A_1$, the absolute value $D_N$ of the difference between the values of the last two registers $C_N$ and $C_{N-1}$ is calculated so that the value of $D_N$ is 1 is there was a reversal or 0 if there was no reversal. In subsequent step 690, the value of $D_N$ is added to each of the registers $DD_1$ through $DD_N$ ($DD_1 = DD_1 + D_N$, $DD_2 = DD_2 + D_N$, ... $DD_N = DD_N + D_N$) which indicate the number of steering reversals during corresponding sampling periods. In step 700, the time indicated by the timer Tc is added to the value of the time registers $t_1$ through $t_N$ in the same way as the step 365 described above. In step 720, the register L is reset to 1 for the next sampling period and control returns to the step 560.

On the other hand, if either $C_F = 0$ or $C_F = 4$ in the step 660 or step 670, the routine goes to a processing block (steps 730 through 910) for determining whether the criteria defining the first and second steering adjustments previously described with reference to FIGS. 6(A) and 6(B) are satisfied. In more detail, CPU 9 first determines whether the four unidirectional steering pulses satisfy the criteria of the second steering operation described above. This determination is carried out by detecting the bit state of either a clockwise-rotation-indicative flag I or a counterclockwise-rotation indicative flag J and comparing a time $T_K$ labelled "$T_Z$" in FIG. 6(B)), indicated by a timer K which starts clocking after detection of the first steering operation, with a previously set time $T_0$. That is to say, if either the clockwise-rotation-indicative flag I or the counterclockwise-rotation-indicative flag J is determined to be set to 1 in step 730 or in step 780 and an inequality $T_K < T_0$ is established in the subsequent step 740 or 790, the CPU 9 determines that the second steering operation has occurred (refer to FIGS. 6(A) and 6(B)) and the routine goes to step 793. However, if $J \neq 1$ or $I = 1$ in the pertinent one of steps 780 or 730, the registers $t_1$ through $t_N$ are incremented in step 760 by the time $T_C$ indicated by the timer C. Similarly, if $T_K \geq T_0$ in the pertinent one of steps 740 and 790, the registers $t_1$ through $t_N$ are incremented by the time $T_C$ in step 760 and the routine continues to step 810 wherein the timer H is set ($T_H = 0$).

Thereafter, the steering adjustment rate over the last four pulses, i.e. the time elapsed since receipt of the third-to-the-last steering pulse, is compared with a predetermined value $t_o$ in step 830. The above described time is indicated by the value of the time register $t_{n-3}$ (indicated by $t_z$ in FIG. 6(B)).

If $t_{n-3} < t_o$ in the step 830, the CPU 9 determines that the first steering operation as shown in FIG. 6(A) or 6(B) has occurred.

Thereafter, in order to allow detection of the second steering adjustment, the timer K is reset ($T_K = 0$) in step 840. Next, if the above-described first steering operation is due to clockwise steering, i.e., $C_F \neq 0$ in step 860, the clockwise-direction-indicative flag I is set to 1 in step 890 and counterclockwise-direction-indicative flag J is reset to zero in step 900. If due to counterclockwise steering, i.e., $C_F = 0$ in the step 860, the counterclockwise-direction-indicative flag J is set to 1 in step 870 and the flag I is reset to zero in step 880. Next, in step 910, the register L is set to 1 and the routine returns to the step 560.

Alternatively, if either of the step sequences 660-730-740 or 670-780-790 is satisfied, i.e. if abrupt steering adjustment in one direction is followed within time $T_0$ by abrupt adjustment in the other direction, control goes to step 793. If $N \leq N_1$ in the step i.e. if the pulse count N is not so large as to indicate that the abrupt adjustments may be due to rough road conditions, then the driver is judged to be drowsy and the alarm means 7 is activated to issue an alarm in step 796. Thereafter, the routine goes to step 990.

It should be noted that if $N > N_1$ in the step 793, the routine goes to step 1030, the CPU 9 having determined that the vehicle is running on a rough road, in order to temporarily halt detection of drowsy driving for a predetermined period of time $A_3$ as explained in more detail later.

If $t_{n-3} > t_o$ in the step 830, i.e., the last four unidirectional steering pulses were not generated abruptly but rather are due to normal steering conditions such as a curve in the road, the routine returns to step 560 after the clockwise-rotation-indicative flag I and the counterclockwise-rotation-indicative flag J is set to zero in steps 832 and 834 and the register L is set to 1 in step 836.

If during the processing in the steps 560 through 910, the value of the time register $t_1$ exceeds the fixed interval of time $A_1$, the routine goes to step 920. In the step 920, the value of register N indicating the pulse count during the newly completed fixed interval of time $A_1$ is compared with the first reference value $N_T$ obtained in the reference value setting loop. If the inequality $N > N_T$ is satisfied in step 920, the routine goes to step 930 wherein the steering pulse number N is compared with a constant predetermined number $N_1$. If $N \leq N_1$ is satisfied (i.e., the vehicle is not running on a rough road), the CPU 9 determines whether or not both of the inequalities $N > N_t$ and $N \leq N_1$ have been accidentally satisfied by a temporary increase in the steering pulses while passing through a curve. To eliminate this last mitigating possibility, the CPU 9 compares the time indicated by the timer H with a fixed interval of time $A_2$. If $T_H > A_2$, the routine goes to step 960 after clearing the timer H since the incidence of unidirectional steering is not frequent enough to indicate excessively curved roads. Thereafter, in the step 960, the CPU 9 compares the value of the register $DD_1$ indicating the number of times steering reversals have been performed within the last fixed interval of time $A_1$ with the second reference value $D_T$ obtained in the reference value setting loop. If $DD_1 < D_T$ in step 960, the alarm means 7 is activated in step 980 after confirming that the value of the above-described register L is above a predetermined number $L_0$ in step 970. That is to say, when the value of the register N indicating the number of steering pulses inputted within the fixed interval of time $A_1$ satisfies $N_T < N \leq N_1$ and the number of steering reversals within the fixed interval of time $A_1$ which is below the second reference value $D_T$ is detected continuously a predetermined number of times $L_0$, the alarm is produced. (Refer to hatched region in FIG. 10.)

On the other hand, if $N > N_1$ in either of steps 930 or 793, the CPU 9 recognizes that the vehicle is running on a rough road. Thereafter, the timer G is actuated to interrupt the monitoring for drowsy driving for the fixed interval of time $A_3$ and the routine returns finally to the step 500.

It should be noted that if $N \leq N_T$ in the step 920, the routine goes to step 1060 wherein the value of register N is compared to 1. If $N = 1$, the routine returns to the step 500 wherein the processing of the drowsy driving detection is restarted from receipt of the next steering pulse. If $N \neq 1$, the routine goes to step 990. In addition, if either of the inequalities $T_H \leq A_2$ in the step 940 or $DD_1 \leq D_T$ in the step 960 is established, the routine goes to step 990. On the other hand, if $L < L_0$ in the step 970, the register L is incremented (step 1080) and the routine goes to step 1000.

In the step 990, the register L is reset (set to 1) and the contents of time registers $t_2$ through $t_N$, registers $C_2$ through $C_N$, registers $DD_2$ through $DD_N$ are moved respectively into the next earlier register, i.e., $t_1 \leftarrow t_2$, $t_2 \leftarrow t_3, \ldots t_{N-1} \leftarrow t_N, t_N \leftarrow 0, C_1 \leftarrow C_2, C_2 \leftarrow C_3, \ldots, C_{N-1} \leftarrow C_N, C_N \leftarrow 2, DD_1 \leftarrow DD_2, DD_2 \leftarrow DD_3, \ldots, DD_{N-1} \leftarrow DN$, and $DD_N \leftarrow 0$, in the step 1000. Then, the register N is decremented in step 1015 and the routine goes to the step 560 to continue the processing of steering pulses which may reflect drowsy driving.

It should be noted that when the vehicle speed drops below the fixed vehicle speed Vo in the step 580, the drowsy driving detection loop is restarted from step 500.

FIG. 9 shows the detailed processing flowchart for discriminating the rotational direction of the steering wheel according to the bit state change between consecutive steering sensor signals. The processing flowchart shown in FIG. 9 is used to determine the direction of each steering pulse in the steps 200, 300, 530, and 620.

The steering angle sensor 1 outputs two one-bit signals in step 2010 and the CPU 9 loads them into the register NEW in step 2020. If the bit state of the signals is the same as that of the immediately preceding signal state, the routine returns to step 2010, having determined that no steering operations have taken place. If the bit state of the signal has changed, the routine goes to the steps 2040 through 2180 to determine whether the change in the bit state of the signal is derived from clockwise rotation or counterclockwise rotation. In steps 2040 through 2180, the signal state of the signal in the register NEW is compared with that of the last signal saved in register OLD. The determined change in the bit state causes a corresponding 1°-pulse indicating the direction of rotation of the steering wheel. In step 2190, the contents of the register NEW are moved into the register OLD for comparison with the bit state of the next steering sensor signal.

It should be noted that although the preferred embodiment detects whether or not the vehicle is running on a rough road (having many bumps and holes) on the basis of the frequency of steering pulses produced, either a vehicle height sensor for detecting the distance between the vehicle body frame and axle (or earth surface) or a vertical force sensor for detecting forces applied vertically to the vehicle vertically may alternatively be provided to detect road roughness.

Such a vehicle height sensor is disclosed in Japanese Patent Application Publications No. 57-172808 and No. 56-153267 and U.S. Pat. No. 4,518,169, the disclosure of which are incorporated herein by reference. In more detail, the Japanese Patent Publication No. 57-172808 relates to a vehicle height adjusting system which comprises: (a) the vehicle height sensor for detecting and signalling the displacement between the vehicle body and axle; (b) a vehicle height adjuster which actuates the vehicle body to rise at a predetermined rate so as to adjust the distance between the vehicle body and axle; and (c) a controller, responsive to a detection signal of the vehicle height sensor, which determines the vehicle height from the detection signal and controls the actuation of the vehicle height adjuster according to the determination of the vehicle height, the controller actuating the vehicle body to rise via the vehicle height adjuster when the change in the vehicle height exceeds a predetermined value.

Therefore, the vehicle height sensor, which might comprise parallel potentiometers provided at each of the four vehicle wheels, is connected to the drowsy driving detection means 5 shown in FIG. 1 via a low-pass filter and an analog-to-digital converter circuit module in the I/O port 15 wherein the output signals $V_H$ of the vehicle height sensor are divided into a directly converted digital signal and a signal filtered at a predetermined frequency which is also digitally converted.

The former signal is stored in the RAM 13 as instantaneous data on the actual vehicle height level and the latter signal is also stored in the RAM 13 as an average value of the vehicle height.

The CPU 9 determines whether or not the vehicle is travelling along a rough road based on the above-described data stored in the RAM 13 and interrupts the detection of drowsy driving for the given predetermined time in the same way as in the preferred embodiment described above.

In more detail, in an initial step ST 1 shown in FIG. 11, a counter to be described later is cleared to read "0". Then in step ST 2, the CPU fetches the actual vehicle height data HL(S), as exemplified in the curve of FIG. 12, and the average vehicle height HL(CR), as exemplified in the straight line of FIG. 12, from the RAM 13. In a third step ST 3, the CPU 9 compares the instantaneous and average vehicle height values HL(S) and (CR). If HL(S) > HL(CR) in the step ST 3, the routine goes to step ST 4 wherein the CPU determines if the difference between the instantaneous and the average vehicle height values (HL(S)−HL(CR)) is greater than a rough road detection level α shown in FIG. 12, the level α being determined according to the current vehicle speed measured by the vehicle speed sensor 3. If HL(S)−HL(CR)>α in the step ST 4, the routine goes to step ST 5 wherein the CPU 9 counts the number of times the vehicle height deviates from the average level by more than α. If HL(S)≦HL(CR) in the third step ST 3, the routine goes to step ST 6, which checks whether or not the difference between the average and instantaneous values is greater than α. If HL(CR)−HL(S)≦α in steps 6 or HL(S)−HL(CR)≦α in step ST 4, control passes directly to step 7 described below. If HL(CR)−HL(S)>α in the step ST 6, the routine goes to the step ST 5.

Figure 12:
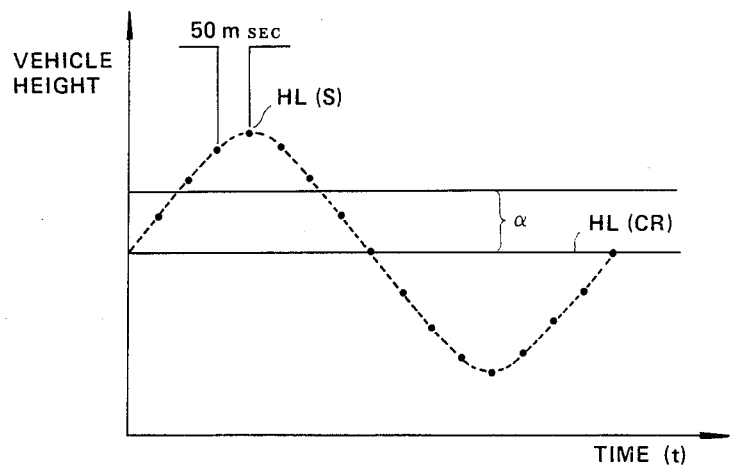
FIG. 12 is a graph representing the relationship between vehicle height and time for explaining the flowchart shown in FIG. 11.

In the subsequent step ST 7, the CPU 9 determines whether or not a predetermined time, e.g., 5 minutes from the start of this detection loop A has elapsed. If time has not elapsed, then after a delay sufficient to result in a predetermined loop execution time, e.g. 50 msec as shown in FIG. 12, control returns to step ST 2 to repeat the loop. If YES in the step ST 7, i.e., if the predetermined time has elapsed, the routine goes to step ST 8 wherein the CPU 9 determines whether or not the vehicle is running on a rough road. Specifically in the step ST 8, the CPU 9 determines whether the number counted in step ST 5 exceeds a predetermined number. If YES in the step ST 8, the CPU 9 interrupts the drowsy driving detection loop; for example, the routine could go to the step 1030 in FIG. 8(F). If NO in the step ST 8, the CPU 9 continues the drowsy driving detection loop shown in FIGS. 8(A) through 8(F) except for the steps 793 and 930.

Furthermore, although the embodiment described above is intended to interrupt the detection of drowsy driving by means of two separate methods, the inventive interruption of drowsy driving detection can of course be employed in systems using only one of the described methods or a system which use a drowsiness detection method other than those shown.

As described hereinbefore, the system for detecting driver drowsiness interrupts the detection processing whenever the system detects that the vehicle is running on a rough road so that erroneous detection of driver drowsiness caused by abnormally abrupt steering operations while driving along a rough road can be prevented.

It will be fully understood by those skilled in the art that the foregoing description is made in terms of preferred embodiments and various changes and modifications may be made without departing from the scope of the present invention as defined by the appended claims.

What is claimed is:

1. A system for detecting driver drowsiness in a vehicle, comprising:
   (a) a first means for recognizing driver drowsiness and alertness on the basis of monitored steering adjustments performed by the driver; and
   (b) a second means for detecting the roughness of the road affecting the steering adjustments on which the vehicle is travelling and disabling said first means during the detection.

2. The system of claim 1, wherein said first means includes means responsive to movement of the steering wheel of the vehicle for producing steering pulses, each steering pulse representing rotation of the steering wheel through a given unit angle and indicating the direction of said rotation, and wherein said second means detects that the vehicle is travelling on an excessively rough road when the number of steering pulses exceeds a first reference number within a fixed interval of time from production of a first one of said steering pulses.

3. The system of claim 1, wherein said first means includes means responsive to movement of the steering wheel of the vehicle for producing steering pulses, each steering pulse representing rotation of the steering wheel through a given unit angle and indicating the direction of said rotation, and wherein said second means detects that the vehicle is travelling on an excessively rough road when at least a predetermined number of steering pulses derived from rotation of the steering wheel in the same direction are produced within a first fixed interval of time.

4. The system of claim 1, wherein said second means comprises a vehicle height sensor for detecting and signalling the distance between the vehicle body frame and axle.

5. A method for detecting driver drowsiness in an automotive vehicle, comprising the steps of:
   (a) monitoring the position of a vehicular steering wheel and signalling the direction and magnitude of rotation of the steering wheel;
   (b) recognizing patterns of steering wheel rotation which would be produced when the vehicle driver is drowsy, said patterns also occurring during vehicle travel over rough roads;
   (c) deriving a measure of the roughness of the road on which the vehicle is travelling; and
   (d) interrupting said pattern recognition step (b) for a fixed interval of time when the roughness of the road surface exceeds a predetermined value.

6. The method of claim 5, wherein the roughness of the road surface is determined to be exceeding said predetermined value when the steering wheel is rotated through at least a predetermined angle within a predetermined interval of time.

7. The method of claim 5, wherein the roughness of the road surface is determined to exceed said predetermined value when the steering wheel is rotated through at least a predetermined angle in a single direction within a predetermined interval of time.

8. The method of claim 5, wherein said monitoring and signalling step (a) includes the steps of detecting rotation of the steering wheel through a unit angle and producing a steering pulse in response to said detection, said steering pulse indicating the direction of rotation of the steering wheel.

9. The method of claim 8, wherein said patterns are recognized when a first group of steering pulses, all in a first direction, all occurring within a predetermined interval of time and the number of pulses in said first group falling within a predetermined range, is followed within a second predetermined interval by a second group of steering pulses, all in the direction opposite said first direction, all occurring within a third predetermined interval of time and the number of pulses in said second group falling within a second predetermined range.

10. The method of claim 9, wherein the roughness of the road surface is determined to be in the excess of said predetermined value when the number of pulses in one of said first and second groups of pulses exceeds the upper limit of the corresponding predetermined range.

11. The method of claim 8, wherein said patterns are recognized when during a given interval of time, the number of steering pulses produced falls with a predetermined range and the number of occurrences of a steering pulse in either direction being followed by a steering pulse in the opposite direction is less than a predetermined number of occurrences.

12. The method of claim 11, wherein the roughness of the road surface is determined to be in excess of said predetermined value when the number of steering pulses produced during said given interval of time exceeds the upper limit of said predetermined range.

13. The method of claim 9, wherein said patterns are also recognized when during a given interval of time, the number of steering pulses produced falls with a third predetermined range and the number of occurrences of a steering pulse in either direction being followed by a steering pulse in the opposite direction is less than a predetermined number of occurrences.

14. The method of claim 13, wherein said given interval of time and said first and second intervals of time are equal and the upper limit values of said first, second and third ranges are equal, and wherein the roughness of the road surface is determined to be in excess of said predetermined value when the number of steering pulses produced during the given interval of time exceeds said upper limit value.

15. The method of claim 14, wherein said predetermined value of road surface roughness is a function of vehicle speed and said steps of pattern recognition and roughness measuring are performed only when vehicles speed exceeds a predetermined threshold value.

16. The method of claim 5, wherein the roughness measuring step comprises the steps of:
 (e) monitoring changes in the vertical distance between the vehicle body and the road surface;
 (f) periodically comparing the magnitude of change with a predetermined threshold value; and
 (g) counting occurrences of change exceeding said threshold,
 and wherein the roughness of the road surface is determined to be in excess of said predetermined roughness value when the number of said counted occurrences within a predetermined interval of time exceeds a predetermined limit.

* * * * *